(12) United States Patent
Larsson et al.

(10) Patent No.: US 12,453,304 B2
(45) Date of Patent: Oct. 28, 2025

(54) ROBOTIC LAWNMOWER CUTTING DECK WITH AN ANGLE ADJUSTMENT ARRANGEMENT, AND A ROBOTIC LAWNMOWER COMPRISING SUCH A CUTTING DECK

(71) Applicant: HUSQVARNA AB, Huskvarna (SE)

(72) Inventors: Svante Larsson, Eksjö (SE); Stefan Toppe, Huskvarna (SE); Jonatan Wendel, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 822 days.

(21) Appl. No.: 17/730,664

(22) Filed: Apr. 27, 2022

(65) Prior Publication Data
US 2022/0338410 A1    Oct. 27, 2022

(30) Foreign Application Priority Data
Apr. 27, 2021    (SE) .................................... 2150530-0

(51) Int. Cl.
*A01D 34/74*    (2006.01)
*A01D 34/00*    (2006.01)
*A01D 101/00*    (2006.01)

(52) U.S. Cl.
CPC ........... *A01D 34/008* (2013.01); *A01D 34/74* (2013.01); *A01D 2101/00* (2013.01)

(58) Field of Classification Search
None
See application file for complete search history.

(56) References Cited

U.S. PATENT DOCUMENTS 6,125,619 A * 10/2000 Wolff .................. A01D 34/662
  56/6
7,028,456 B2 * 4/2006 Thatcher ................ A01D 34/74
  56/15.9

(Continued)

FOREIGN PATENT DOCUMENTS

CN    104427856 A    3/2015
CN    104604427 A    5/2015

(Continued)

OTHER PUBLICATIONS

Swedish Search Report in Swedish patent application No. 2150530-0, dated Dec. 3, 2021.

*Primary Examiner* — Joseph M Rocca
*Assistant Examiner* — Sunny D Webb
(74) *Attorney, Agent, or Firm* — Burr & Forman (57) ABSTRACT

A robotic lawnmower cutting deck may include a cutting system which may include at least two cutters with a cutting disc and cutter motor. The cutters may be supported by a cutter support beam which may be supported at respective supporting positions by a first link arm and a second link arm. At each supporting position, the link arms may be pivotably attached to the cutter support beam with a corresponding first pivot pin and second pivot pin that may be fixed relative each other. The link arms may be pivotably attached to a frame part with a corresponding third pivot pin and fourth pivot pin, which may have an adjustable relation relative each other such that the cutter support beam may be rotated about a longitudinal beam extension when the relation between the third pivot pin and fourth pivot pin is adjusted.

17 Claims, 10 Drawing Sheets

(56) References Cited

U.S. PATENT DOCUMENTS 7,117,660 B1 * 10/2006 Colens ................ A01D 34/008
56/DIG. 7
2015/0189830 A1 7/2015 Jägenstedt et al.

FOREIGN PATENT DOCUMENTS

| CN | 111133882 A | 5/2020 | |
|---|---|---|---|
| CN | 111201899 A | 5/2020 | |
| EP | 3571917 A1 * | 11/2019 | ............. A01D 34/74 |
| FR | 2614755 A1 | 11/1988 | |
| GB | 2295304 A * | 5/1996 | ........... A01D 34/008 |
| JP | 2020025494 A | 2/2020 | |
| JP | 7061793 B2 * | 5/2022 | |
| KR | 20190074333 A | 6/2019 | |
| WO | WO-0074466 A1 * | 12/2000 | ........... A01D 34/736 |
| WO | WO-2014007729 A1 * | 1/2014 | ........... A01D 42/00 |
| WO | WO-2020171753 A1 * | 8/2020 | ........... A01D 34/008 |
| WO | 2021110414 A1 | 6/2021 | |

* cited by examiner

SECTION A-A

ROBOTIC LAWNMOWER CUTTING DECK WITH AN ANGLE ADJUSTMENT ARRANGEMENT, AND A ROBOTIC LAWNMOWER COMPRISING SUCH A CUTTING DECK

TECHNICAL FIELD

The present disclosure relates to a robotic lawnmower cutting deck comprising a cutting system which in turn comprises at least two cutters. Each cutter comprising a cutting disc and a corresponding cutter motor, and each cutting disc is drivably connected to the corresponding cutter motor

BACKGROUND

Robotic work tools such as for example robotic lawnmowers are becoming increasingly more popular. In a typical deployment work area, such as a garden, the work area is enclosed by a boundary wire with the purpose of keeping the robotic lawnmower inside the work area. An electric control signal may be transmitted through the boundary wire thereby generating an (electro-) magnetic field emanating from the boundary wire. The robotic lawnmower is typically arranged with one or more sensors adapted to sense the control signal.

Alternatively, or as a supplement, the robotic lawnmower can be equipped with a navigation system that is adapted for satellite navigation as well as navigation by means of a local base station.

The robotic lawnmower is adapted to cut grass on a user's lawn automatically and can be charged automatically without intervention of the user, and does not need to be manually managed after being set once.

The robotic lawnmower comprises a cutting system that can comprise several cutters with cutting discs that carry pivoting knives, and corresponding cutter motors that are adapted to bring the cutting discs into rotation when running. Two or more cutters are suitable for larger cutting areas such as larger gardens, football fields, golf courses and municipal green spaces.

WO 2014007729 describes a robotic lawn mower having a cutting deck with five cutting discs that are comprised in five cutters supported from a single cutter support beam which in turn may be supported at each of its respective ends by link arms forming a parallelogram. Different means for adjusting the cutting height for the cutters are described, for example by adjusting an angle formed between the parallelograms and a plane of a supporting frame.

Due to the high demand on cutting result for this type of robotic lawn mower, in addition to be able to change the cutting height, a cutting disc angle of incidence, constituting an angle of approach, towards the ground should be adjustable. This adjustment is not only needed during production to achieve the correct angle, but also for maintenance. These adjustments can be needed due to normal wear or for when accidents such as collisions occur.

It is therefore desired to provide means for an uncomplicated, quickly managed and reliable change of a cutting disc angle of approach towards the ground.

SUMMARY

The object of the present disclosure is to provide means for an uncomplicated, quickly managed and reliable change of a cutting disc angle of approach towards the ground.

This object is achieved by means of a robotic lawnmower cutting deck comprising a cutting system which in turn comprises at least two cutters. Each cutter comprises a cutting disc and a corresponding cutter motor, where each cutting disc is drivably connected to the corresponding cutter motor. The cutters are supported by a cutter support beam which has a longitudinal beam extension and in turn is supported at respective supporting positions by a corresponding first link arm and a corresponding second link arm. At each supporting position, the link arms are pivotingly attached to the cutter support beam with a corresponding first pivot pin and second pivot pin, and the link arms are pivotingly attached to a frame part with a corresponding third pivot pin and fourth pivot pin. Furthermore, at each supporting position, the first pivot pin and second pivot pin are fixed relative each other, and the third pivot pin and fourth pivot pin have an adjustable relation relative each other. In this way, the cutter support beam is rotated around the longitudinal beam extension when the relation between the third pivot pin and fourth pivot pin is adjusted.

This provides an accurate and reliable adjustment of the angular position of the cutter support beam.

According to some aspects, at each supporting position, one of the third pivot pin and fourth pivot pin constitutes an adjustment pin that runs along a longitudinal pin extension via an elongated opening in the frame part and is received in a holding casing. The holding casing comprises an adjustment aperture that comprises inner adjustment threads and runs perpendicular to the longitudinal pin extension. The adjustment aperture is adapted to receive an adjustment bolt with outer adjustment threads that engage the inner adjustment threads. Turning of the corresponding adjustment bolt will move the corresponding holding casing such that the corresponding adjustment pin is moved within the elongated opening.

In this way, a very accurate adjustment is enabled by screwing each adjustment bolt, the corresponding adjustment pin moving within the corresponding elongated opening such that the cutter support beam is rotated around the longitudinal beam extension.

According to some aspects, each adjustment bolt is rotatably mounted to flanges that are comprised in the frame part and extend away from the elongated opening.

In this manner, a secure and rigid mounting of each adjustment bolt is enabled, resulting in an accurate and reliable adjustment of the angular position of the cutter support beam According to some aspects, for each holding casing the cutting deck comprises a locking screw with outer locking threads. Each holding casing comprises a slot that divides the casing aperture, and a locking aperture that comprises inner locking threads and runs along a locking aperture extension. The locking aperture is adapted to receive the corresponding locking screw such that the outer locking threads engage the inner locking threads. For each holding casing, when the locking screw is tightened, the slot is decreased in width such that the adjustment bolt is prevented from rotating in the casing aperture.

In this way, a performed adjustment is secured from being accidentally and/or unintentionally altered.

According to some aspects, for each holding casing, the adjustment pin comprises outer holding threads and is received in a holding aperture in the holding casing, and the holding aperture comprises inner holding threads that are adapted to engage the outer holding threads.

This provides a reliable and secure mounting of the adjustment pin to the holding casing.

According to some aspects, the cutting deck is covered by a first body part which in turn comprises a first removable cover plate and a second removable cover plate. When a cover plate is removed, access is provided to a corresponding locking screw and adjustment bolt, enabling the relation between the corresponding third pivot pin and fourth pivot pin to be adjusted.

By providing easy access to the locking screws and the adjustment bolts, an adjustment can be performed in an uncomplicated and reliable manner.

According to some aspects, the supporting positions correspond to respective end portions of the cutter support beam.

This provides a reliable turning torque when the cutter support beam is rotated.

According to some aspects, when the cutter support beam is rotated around the longitudinal beam extension, a main extension of the cutting discs will assume an angle of approach to a horizontal ground.

In this manner, an optimal grass cutting performance can be obtained by means of proper adjustment of the adjustment of the angular position of the cutter support beam, resulting in an advantageous angle of approach.

According to some aspects, the cutting deck comprises at least two aluminum beams that run parallel to the longitudinal beam extension where two of the aluminum beams run at different sides of the cutter support beam. The cutting deck comprises a first pair of steel plates and a second pair of steel plates, where first distal portions of the aluminum beams are partly sandwiched between the first pair of steel, and where second distal portions of the aluminum beams are partly sandwiched between the second pair of steel plates.

This provides a combination of a lightweight aluminum construction and a steel construction that can withstand fatigue loads. A frame is provided with a relative low weight that is suitable for robotic lawnmowers which for example are subject to impact loads and have a long service life.

According to some aspects, the steel plates are attached to the aluminum beams by means of screws. Joining the frame with screws gives good tolerance benefits, the screw connections should be tightened with such a high torque that the risk of slipping between the parts in the connections is minimized.

According to some aspects, the frame parts are attached to a corresponding steel plate. According to some further aspects, the frame parts are attached to a frame structure that is comprised in the cutting deck.

This way, the setting of the angle of approach will be stable since the structure of the cutting deck is rigid and provides a high degree of torsional rigidity, which means that the link arms and the cutter support beam are firmly held in place in the desired position.

According to some aspects, the cutting deck comprises at least two cutting height adjusting means that are adapted to position the cutter support beam at different vertical positions such that a cutting height corresponding to a height that a main extension of the cutting discs will assume with respect to a horizontal ground is adapted to be adjusted.

The advantages conferred by have preset a certain beneficial angle of approach $\varphi$ are maximized by having the height h adjusted in dependence of the characteristics of the area to be cut.

This object is also achieved by means of a robotic lawnmower comprising a cutting deck according to the above, being associated with the advantages mentioned above.

BRIEF DESCRIPTION OF THE DRAWINGS

The present disclosure will now be described more in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
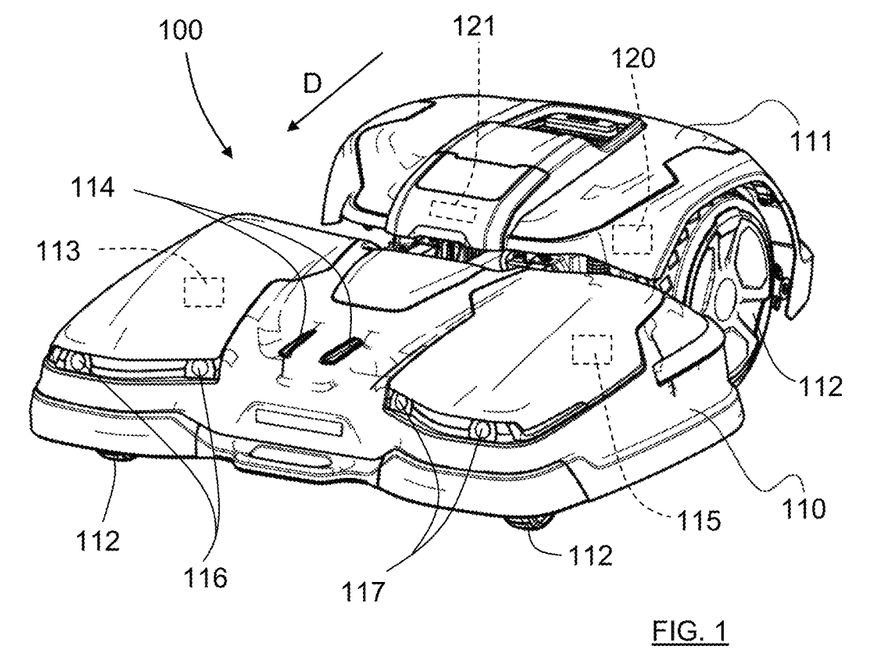
FIG. 1 shows a schematic perspective side view of a robotic lawnmower.
Figure 2:
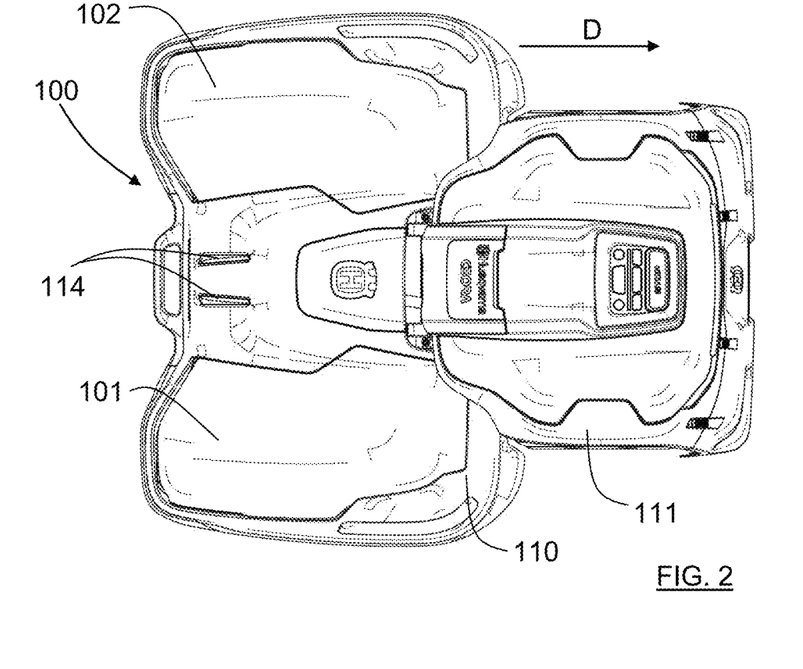
FIG. 2 shows a schematic top view of the robotic lawnmower.
Figure 3:
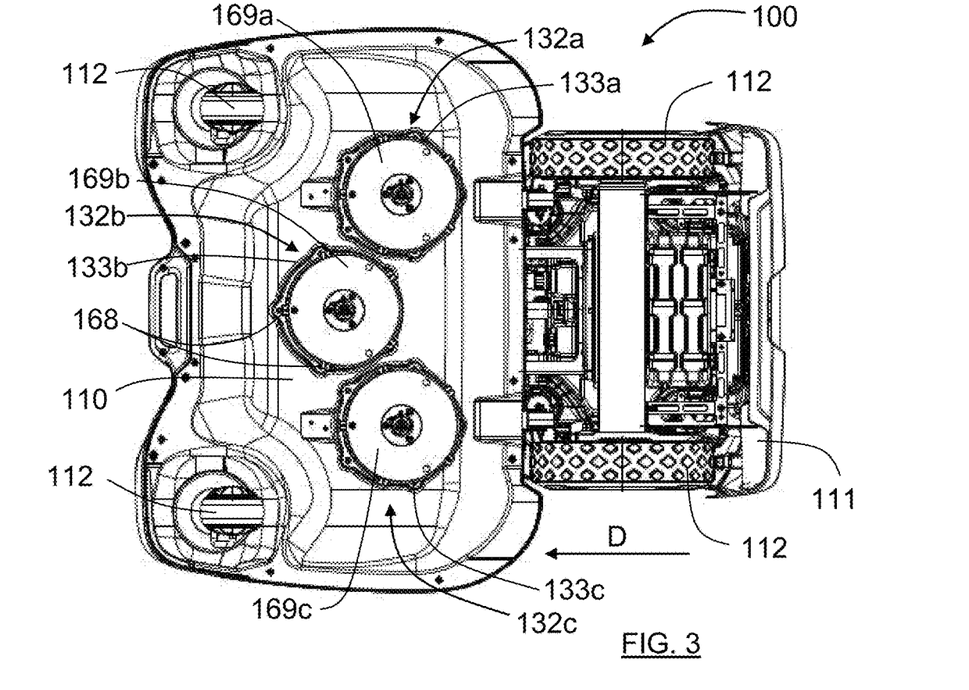
FIG. 3 shows a schematic bottom view of the robotic lawnmower.

FIG. 1 shows a perspective view of a robotic lawnmower 100, FIG. 2 shows a top view of the robotic lawnmower 100 and FIG. 3 shows a bottom view of the robotic lawnmower 100. The robotic lawnmower 100 is adapted for a forward travelling direction D, has a body 110, 111 and a plurality of wheels 112; in this example the robotic lawnmower 100 has four wheels 112, two front wheels and two rear wheels. Other wheel configurations are of course possible, according to some aspects there can be two pairs of front wheels. The robotic lawnmower 100 comprises a control unit 113 and at least one electric motor 120 (only schematically indicated in FIG. 1), where at least some of the wheels 112 are drivably connected to at least one electric motor 120. There may be one respective motor drivably connected to a corresponding wheel 112, for some of the wheels or all the wheels 112.

It should be noted that even if the description herein is focused on electric motors, combustion engines may alternatively be used in combination with an electric motor arrangement. The robotic lawnmower 100 may be a multi-chassis type or a mono-chassis type. A multi-chassis type comprises more than one body parts that are movable with respect to one another. A mono-chassis type comprises only one main body part.

In this example embodiment, the robotic lawnmower 100 is of a multi-chassis type, having a first body part 110 and a second body part 111, which body parts 110, 111 substantially house all components of the robotic lawnmower 100.

The robotic lawnmower 100 also has at least one rechargeable electric power source such as a battery 121 (only schematically indicated in FIG. 1) for providing power to the electric motor 120 and/or one or more cutter motors 134a, 134b, 134c. Such a battery 121 can be charged via charging skids 114 at a charging station in a well-known manner.

Figure 4:
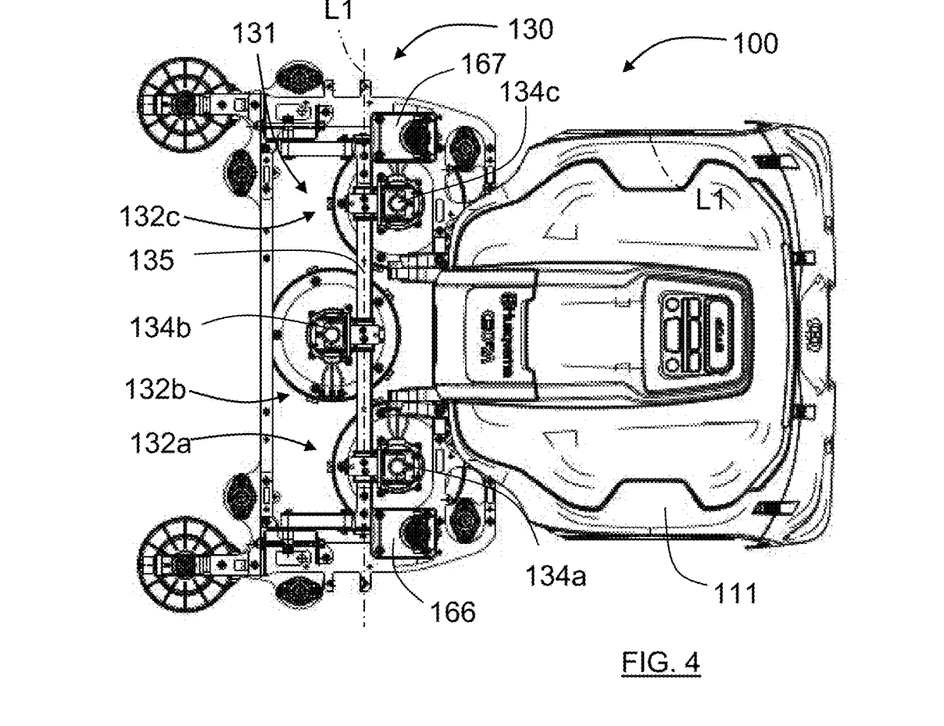
FIG. 4 shows a schematic top view of the robotic lawnmower with a front body removed.
Figure 5:
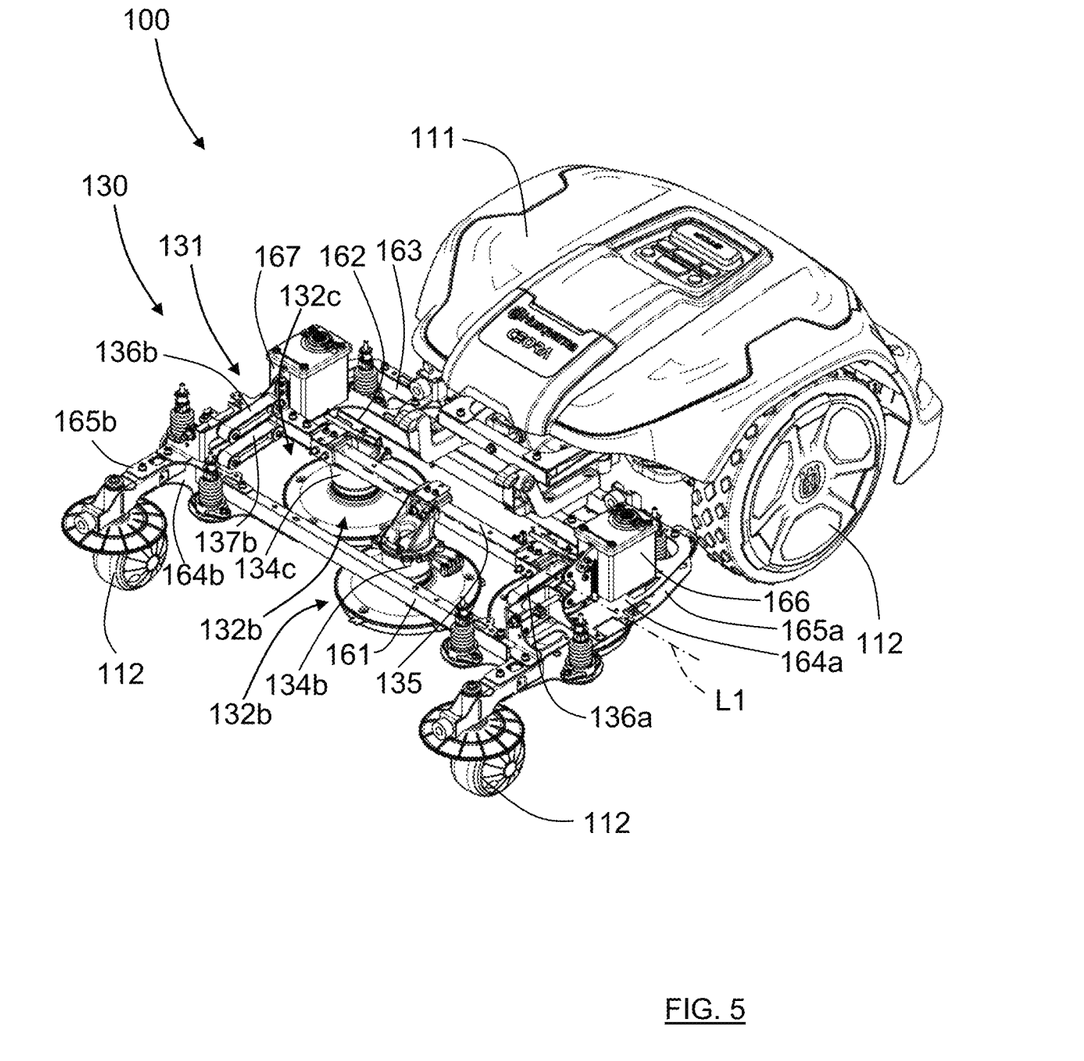
FIG. 5 shows a schematic perspective side view of FIG. 4.
Figure 6:
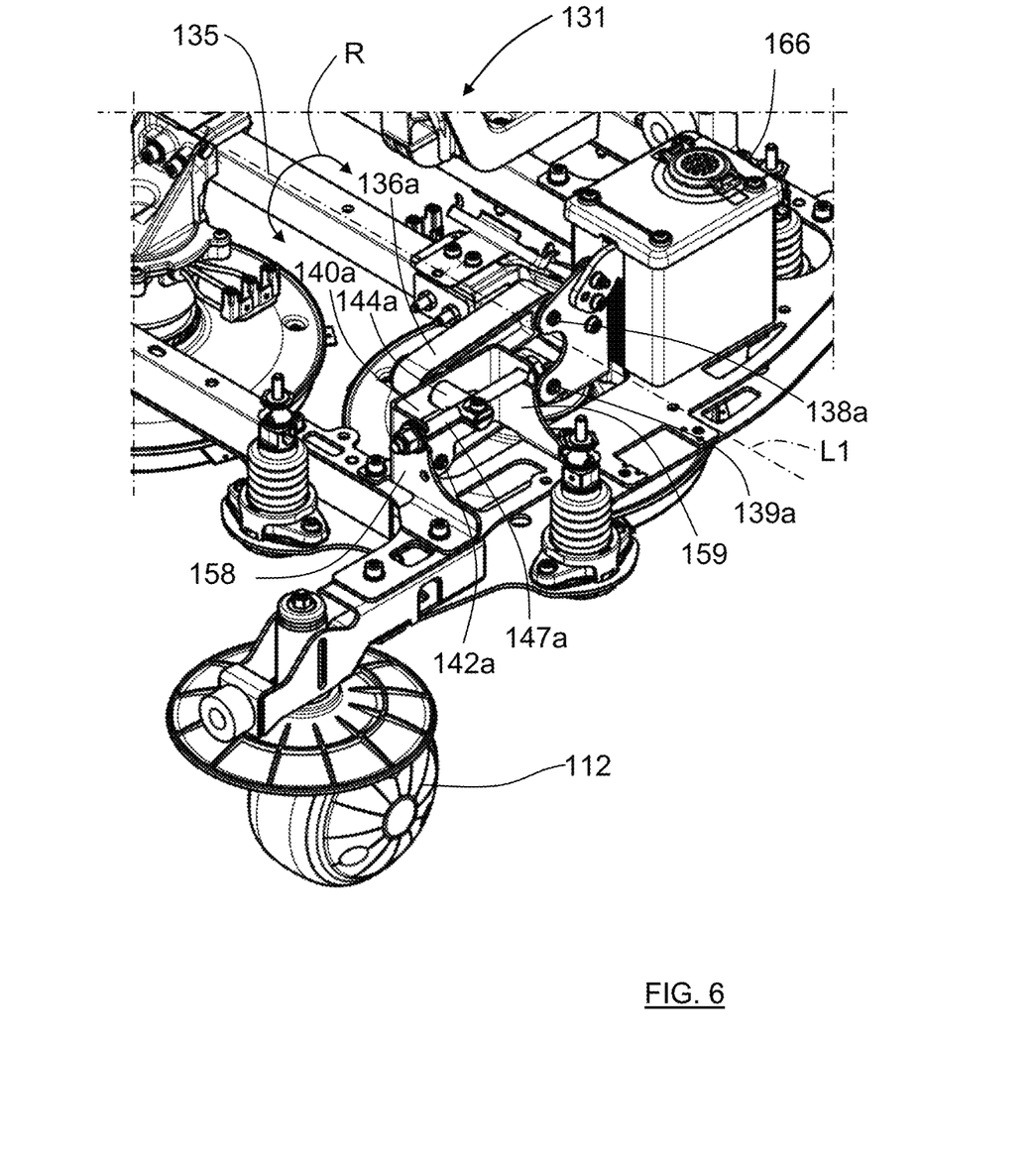
FIG. 6 shows a schematic first enlarged portion of FIG. 5.
Figure 7A:
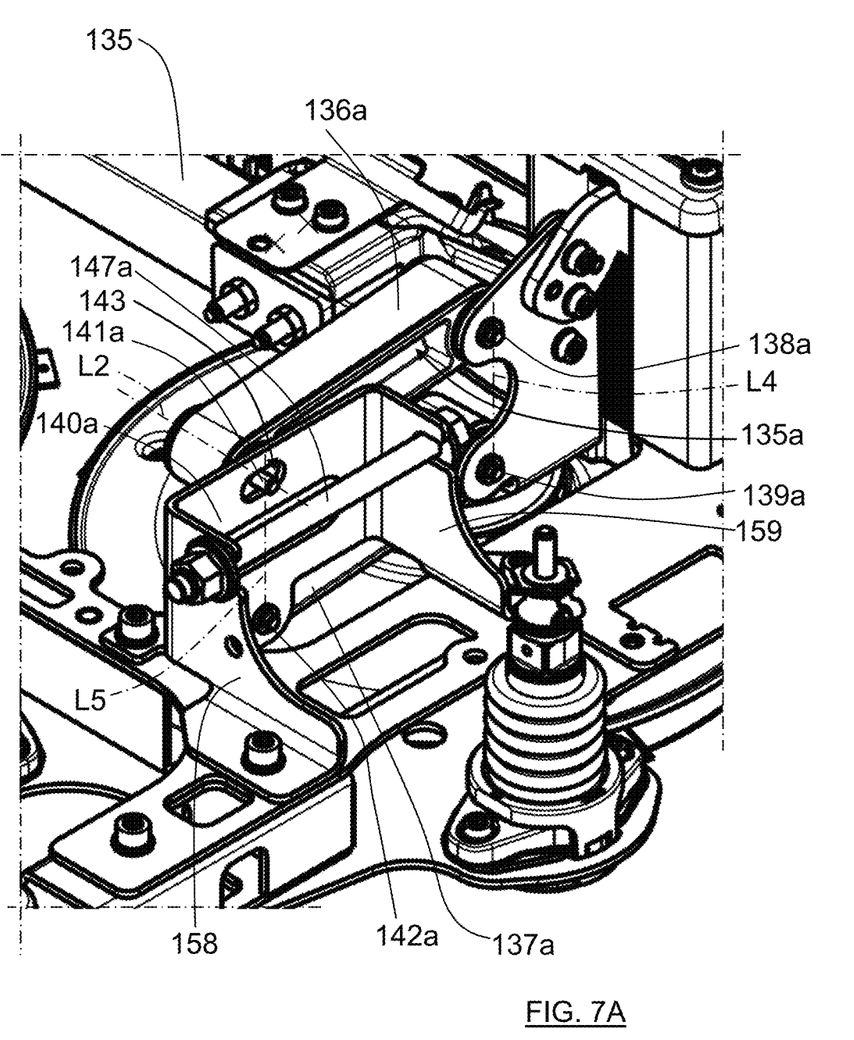
FIG. 7A shows a schematic enlarged portion of FIG. 6 with a holding casing and its associated parts removed.
Figure 7B:
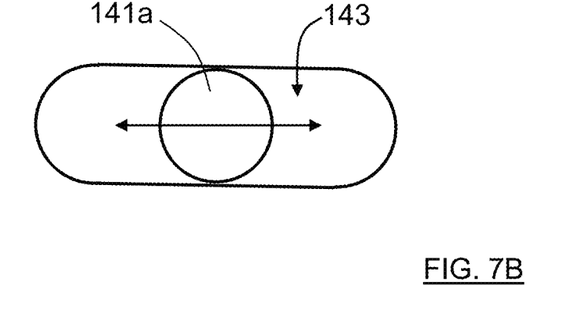
FIG. 7B shows a schematic enlarged front view of an elongated opening and adjustment pin.
Figure 8:
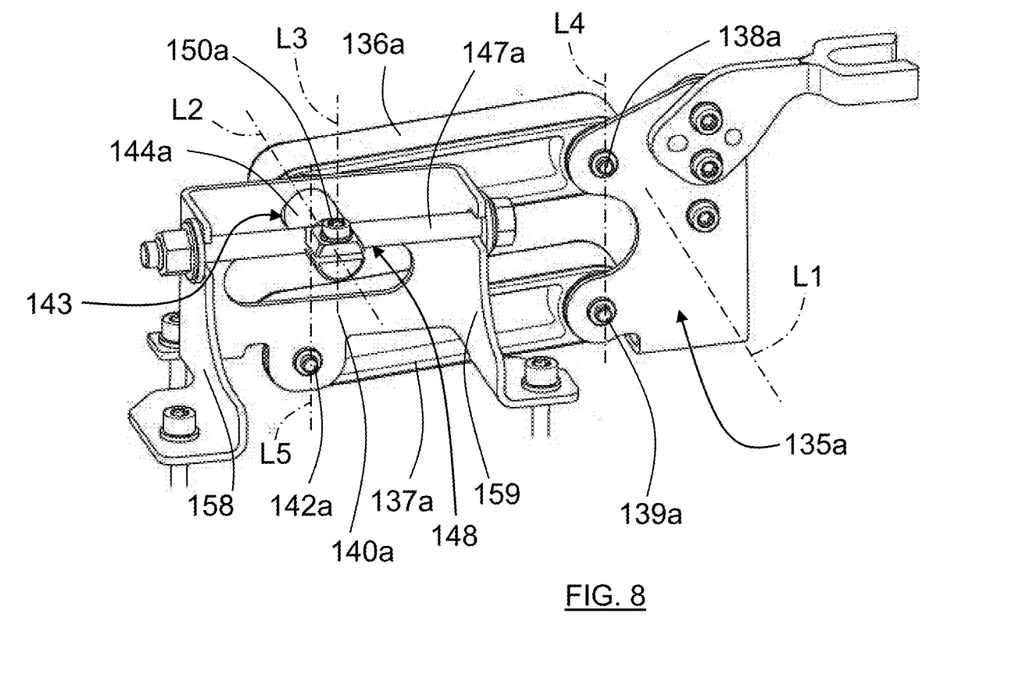
FIG. 8 shows a schematic side perspective view of a cutter support beam end and associated details.
Figure 9:
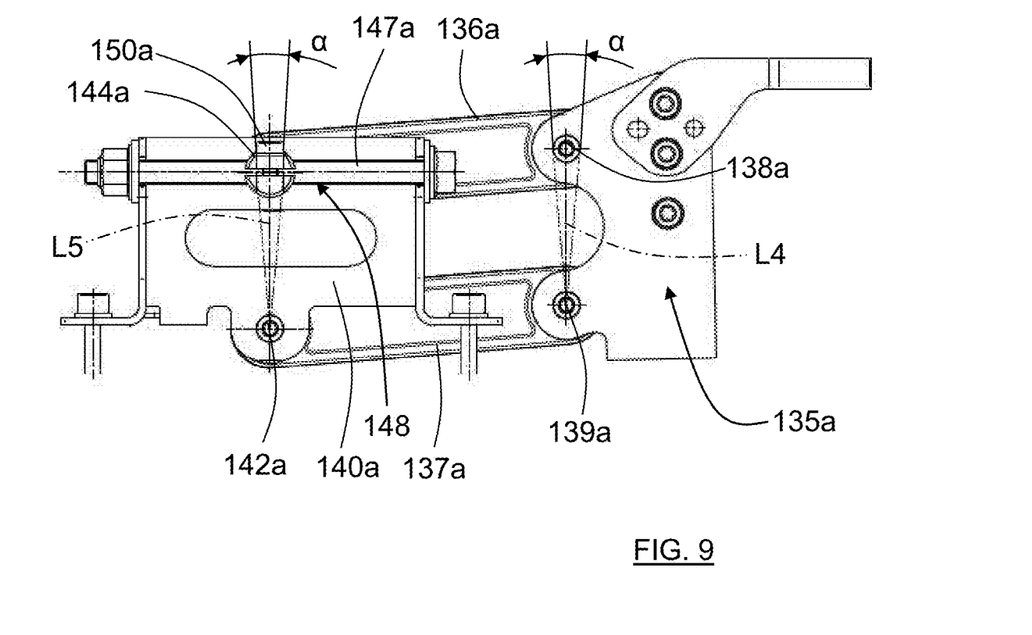
FIG. 9 shows a schematic side view of FIG. 8.

In the following, reference is also made to FIG. 4-FIG. 17, where FIG. 4 shows a schematic top view of the robotic lawnmower with a front body removed, FIG. 5 shows a schematic perspective side view of FIG. 4, FIG. 6 shows a schematic first enlarged portion of FIG. 5, FIG. 7A shows a schematic enlarged portion of FIG. 6 with a holding casing and its associated parts removed, FIG. 7B shows a schematic enlarged front view of an elongated opening and adjustment pin, FIG. 8 shows a schematic side perspective view of a cutter support beam end and associated details, and FIG. 9 shows a schematic side view of FIG. 8.

Figure 10:
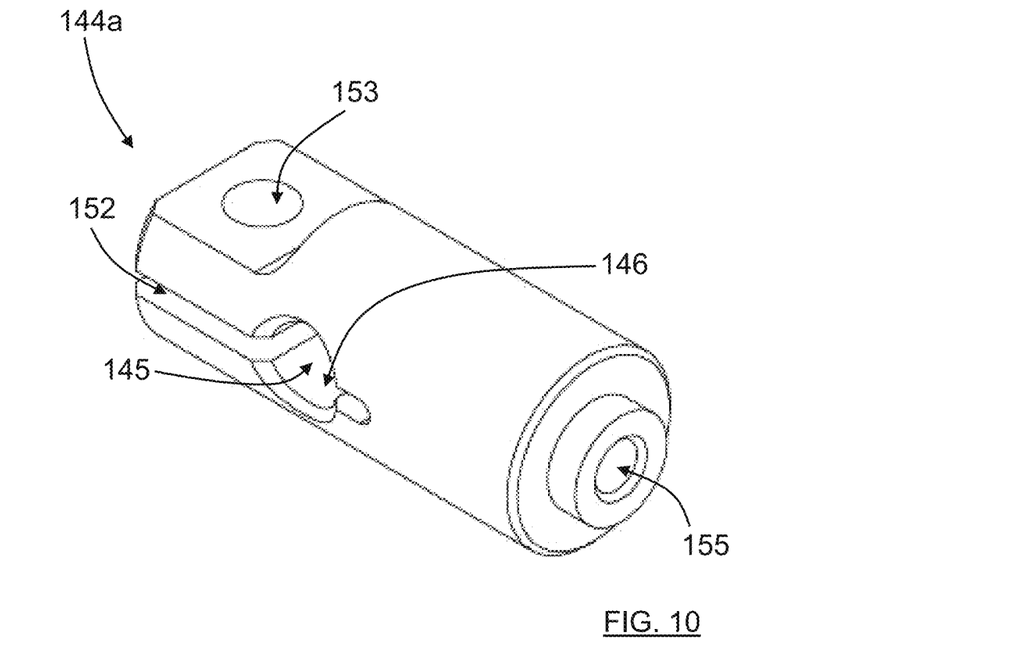
FIG. 10 shows a first schematic side perspective view of a holding casing.
Figure 11:
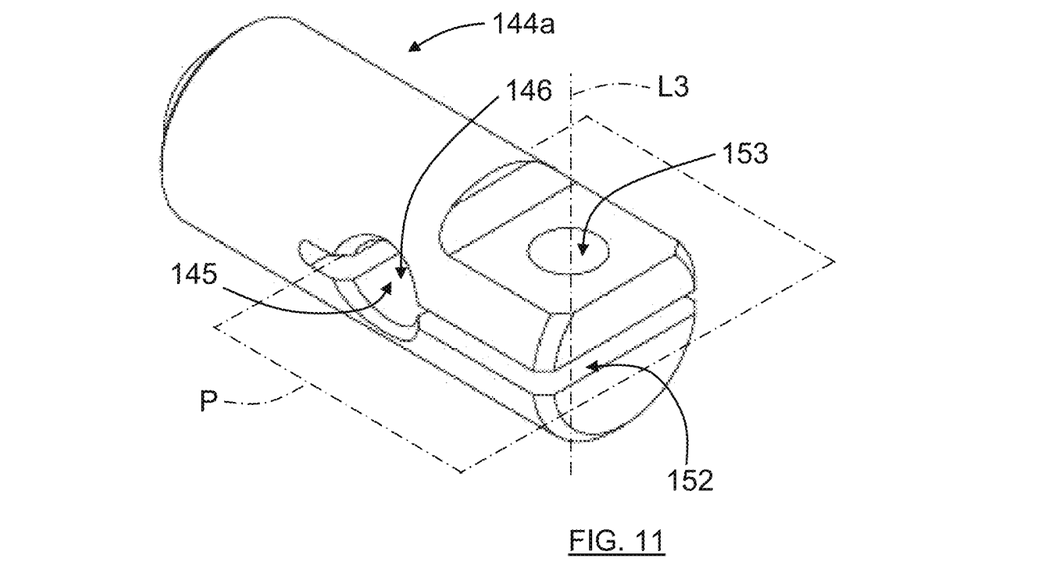
FIG. 11 shows a second schematic side perspective view of a holding casing.
Figure 12:
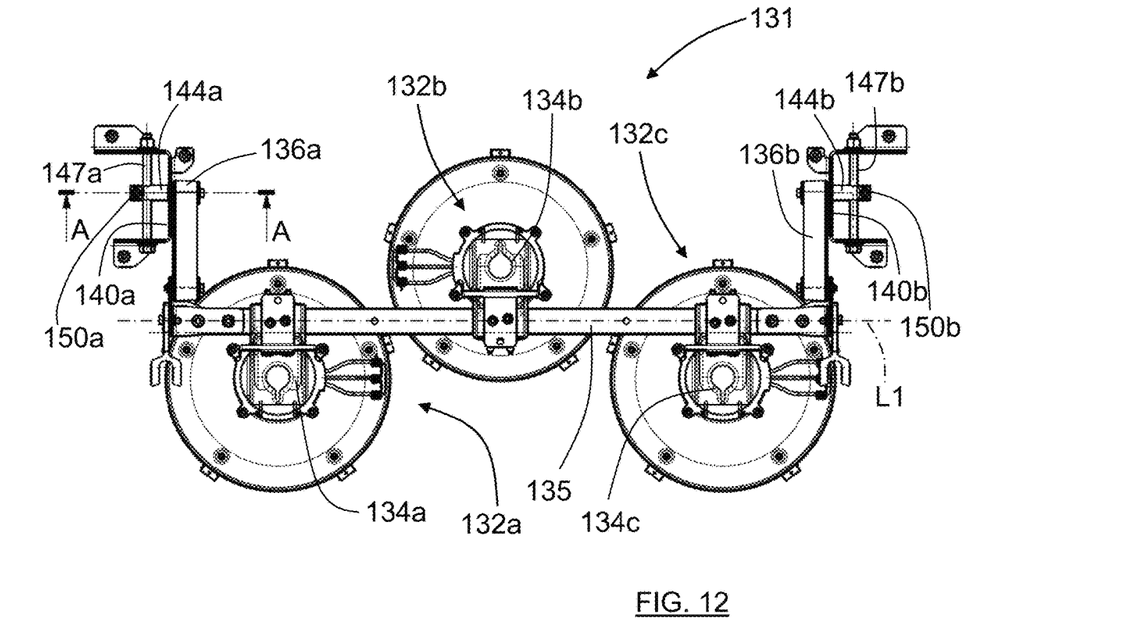
FIG. 12 shows a schematic top view of a part of a cutting deck.
Figure 13:
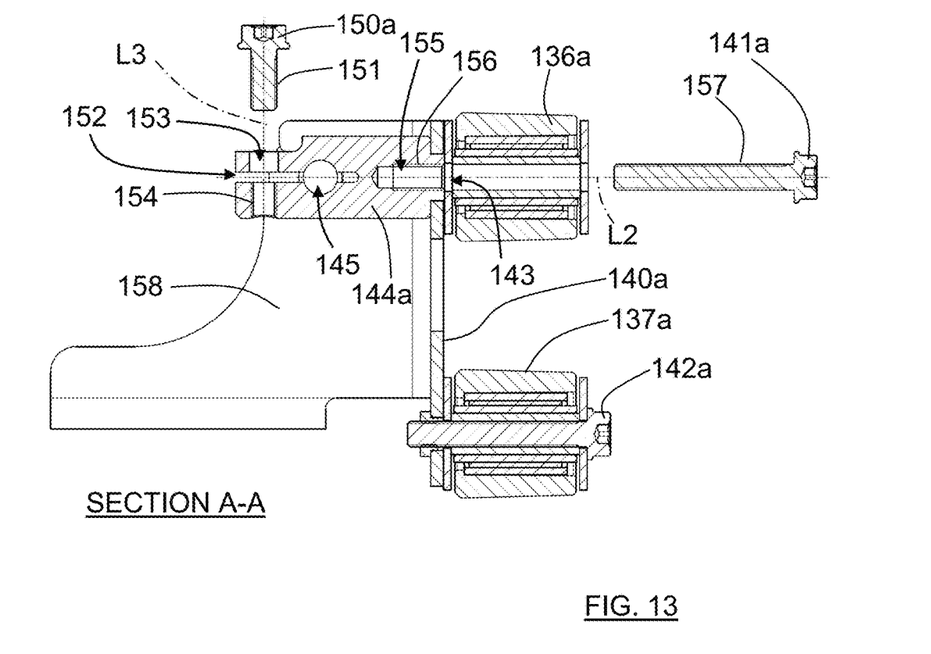
FIG. 13 shows a schematic partly exploded section view of FIG. 12.
Figure 14:
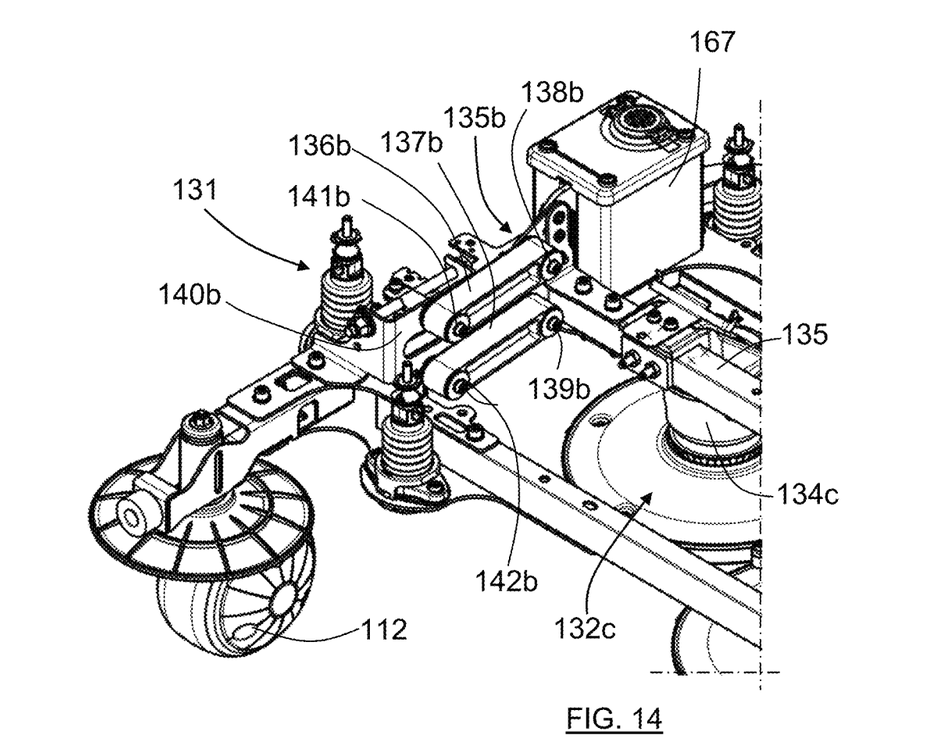
FIG. 14 shows a schematic second enlarged portion of FIG. 5.
Figure 15:
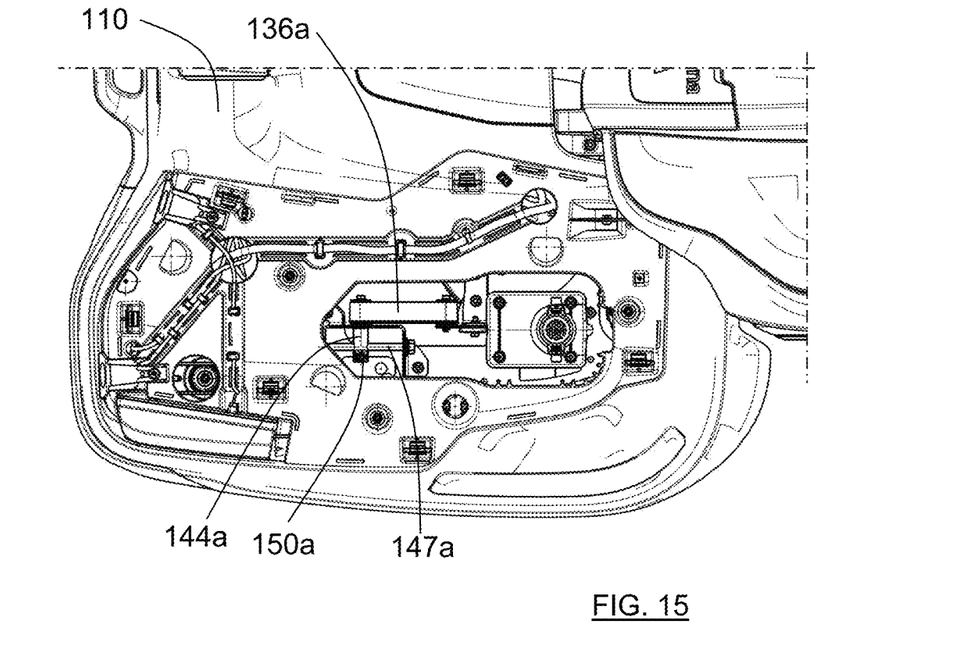
FIG. 15 shows a schematic top partial view of a front body with a cover part removed.
Figure 16:
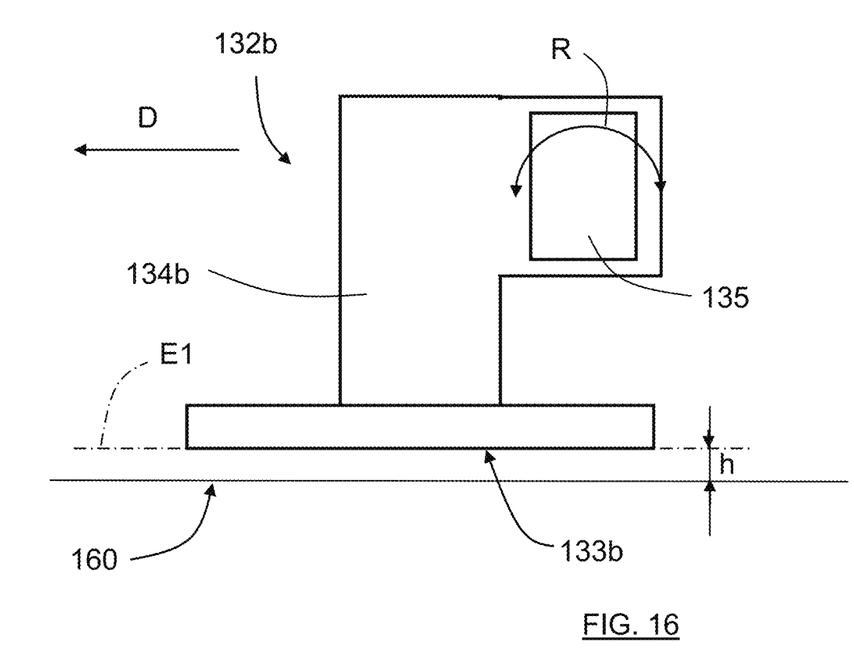
FIG. 16 shows a schematic side view of a cutter support beam with an attached cutter in a first angular position.
Figure 17:
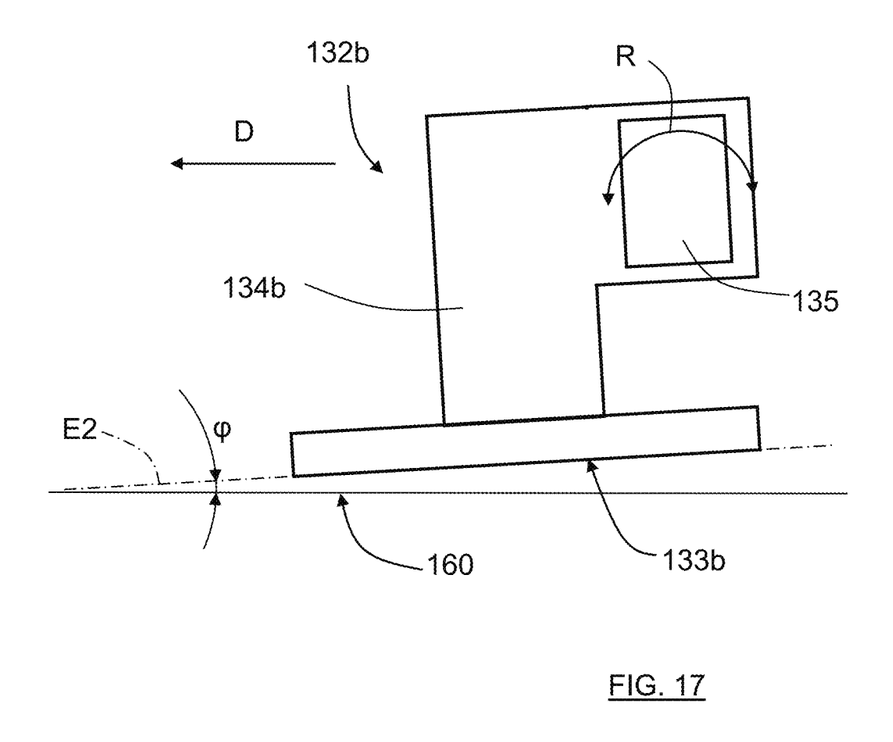
FIG. 17 shows a schematic side view of the cutter support beam with the attached cutter in a second angular position.

Furthermore, FIG. 10 shows a first schematic side perspective view of a holding casing, FIG. 11 shows a second schematic side perspective view of a holding casing, FIG. 12 shows a schematic top view of a part of a cutting deck, FIG. 13 shows a schematic partly exploded section view of FIG. 12, FIG. 14 shows a schematic second enlarged portion of FIG. 5, FIG. 15 shows a schematic top partial view of a front body with a cover part removed, FIG. 16 shows a schematic side view of a cutter support beam with an attached cutter in a first angular position, and FIG. 17 shows a schematic side view of the cutter support beam with the attached cutter in a second angular position.

As in particular shown in FIG. 4, FIG. 5 and FIG. 12, the robotic lawnmower 100 comprises a robotic lawnmower cutting deck 130 that in turn comprising a cutting system 131. The cutting system 131 comprises at least two cutters 132a, 132b, 132c, in this example there are three cutters. Each cutter 132a, 132b, 132c comprises a corresponding cutting disc 133a, 133b, 133c and a corresponding cutter motor 134a, 134b, 134c. According to some aspects, each cutting disc 133a, 133b, 133c comprises one or more pivoting cutting knives, in this example five pivoting cutting knives 168, for reasons of clarity only two being indicated in FIG. 2 for a middle cutting disc 133b. The number of pivoting cutting knives may of course vary, and other types of cutting means are of course conceivable. According to some aspects, as an addition, each cutting disc 133a, 133b, 133c may comprise a freely rotating coaxial plate or disc, a so-called skid plate 169a, 169b, 169c, that is the part of the cutting disc 133a, 133b, 133c that is closest to the ground. Such a skid plate 169a, 169b, 169c reduces noise and saves energy.

Each cutting disc 133a, 133b, 133c is drivably connected to the corresponding cutter motor 134a, 134b, 134c, where the cutters 132a, 132b, 132c are supported by a cutter support beam 135 which has a longitudinal beam extension L1 and in turn is supported at respective supporting positions 135a, 135b by a corresponding first link arm 136a, 136b and a corresponding second link arm 137a, 137b. The supporting positions 135a, 135b can be at any suitable position along the cutter support beam 135, according to some aspects the supporting positions correspond to respective end portions 135a, 135b of the cutter support beam 135; a first supporting position 135a corresponds to a first end portion 135a and a second supporting position 135a corresponds to a second end portion 135b.

According to some aspects, as for example shown in FIG. 4 and FIG. 5, the link arms 136a, 136b; 137a, 137b mainly extend at an angle to the longitudinal beam extension L1, and according to some aspects, the angle is substantially 90°.

Furthermore, as for example shown in FIG. 6, FIG. 7A, FIG. 8, FIG. 9 and FIG. 14, at each supporting position 135a, 135b, the link arms 136a, 136b; 137a, 137b are pivotingly attached to the cutter support beam 135 with a corresponding first pivot pin 138a, 138b and second pivot pin 139a, 139b, and the link arms 136a, 136b; 137a, 137b are pivotingly attached to a frame part 140a, 140b with a corresponding third pivot pin 141a, 141b and fourth pivot pin 142a, 142b.

According to the present disclosure, at each supporting position 135a, 135b, the first pivot pin 138a, 138b and second pivot pin 139a, 139b are fixed relative each other, and the third pivot pin 141a, 141b and fourth pivot pin 142a, 142b have an adjustable relation relative each other. This means that that the cutter support beam 135 is rotated R around the longitudinal beam extension L1 when the relation between the third pivot pin 141a, 141b and fourth pivot pin 142a, 142b is adjusted. This provides an accurate and reliable adjustment of the angular position of the cutter support beam 135.

According to some aspects, as in particular shown in FIG. 16 and FIG. 17, when the cutter support beam 135 is rotated R around the longitudinal beam extension L1, a main extension E1 of the cutting discs 133a, 133b, 133c will assume an angle of approach φ to a horizontal ground 160. In FIG. 16 and FIG. 17, this is illustrated for a middle cutter 132b, but the same type of adjustment is of course achieved for all cutters 132a, 132b, 132c.

In this manner, an optimal grass cutting performance can be obtained by means of proper adjustment of the adjustment of the angular position of the cutter support beam 135, resulting in an advantageous angle of approach φ. According to some aspects, the angle φ is between 0.5° and 3°. This means that the cutting discs are closest to the ground at their frontmost portions. It is desired to provide an accurate setting of the angle of approach φ, and this is enabled by means of the present disclosure.

The adjustment is not only needed during production to achieve the correct angle φ, but also for maintenance. These adjustments may need to be done due to normal wear or when accidents such as collisions have occurred.

According to some aspects, as for example shown in FIG. 7A, FIG. 7B, FIG. 13 and FIG. 14, at each supporting position 135a, 135b, one of the third pivot pin 141a, 141b and fourth pivot pin 142a, 142b constitutes an adjustment pin 141a, 141b. In the following example, the corresponding third pivot pin 141a 141b constitutes the corresponding adjustment pin 141a, 141b that runs along a longitudinal pin extension L2 via an elongated opening 143 in the frame part 140a, 140b and is received in a holding casing 144a, 144b that comprises an adjustment aperture 145 that comprises inner adjustment threads 146 and runs perpendicular to the longitudinal pin extension L2.

As illustrated for the first holding casing 144a in FIG. 13, according to some aspects the adjustment pin 141a comprises outer holding threads 157 and is received in a holding aperture 155 in the holding casing 144, and the holding aperture 155 comprises inner holding threads 156 that are adapted to engage the outer holding threads 157. This provides a reliable and secure mounting of the adjustment pin 141a to the holding casing 144a.

It is to be noted that only a first holding casing 144a and a first elongated opening 143, being associated with the first supporting position 135a, is shown in more detail in FIG. 10, FIG. 11 and FIG. 13, but is should be understood that there is a second holding casing 144b, as shown in for example FIG. 12, that corresponds to the first holding casing 144a, and a corresponding elongated opening 143 (only on elongated opening, a first elongated opening, being shown in the Figures).

The adjustment aperture 145 is adapted to receive an adjustment bolt 147a, 147b with outer adjustment threads 148 that engage the inner adjustment threads 146. Turning of the corresponding adjustment bolt 147a, 147b will move the corresponding holding casing 144a, 144b such that the corresponding adjustment pin 141a, 141b is moved within the corresponding elongated opening 143. In this way, a very accurate adjustment is enabled by screwing each adjustment bolt 147a, 147b, the corresponding adjustment pin 141a, 141b moving within the corresponding elongated opening 143 such that the cutter support beam 135 is rotated R around the longitudinal beam extension L1.

This rotation is accomplished since, looking at the first supporting position 135a, when a first adjustment bolt 147a is rotated, the first holding casing 144a is moved together with a first adjustment pin 141a, the first link arm 136a is moved relative the second link arm 137a, the second link arm 137a being held in a fixed position by means of the second pivot pin 139a and the fourth pivot pin 142a. As illustrated in FIG. 9, this procedure results in an angular change between, on one hand, the first pivot pin 141a (shown in FIG. 7A and FIG. 7B) and the third pivot pin, and on the other hand the second pivot pin 139a and the fourth pivot pin 142a. This angular change is denoted by an angular interval α.

In other words, as illustrated for the first supporting position 135a in FIG. 7A, FIG. 8 and FIG. 9, there is a first connection extension L4, connecting the first pivot pin 138a and the second pivot pin 139a, and a second connection extension L5, connecting the third pivot pin 141a, and the fourth pivot pin 142a. As in particular shown in FIG. 9, these connection extensions L4, L5 will move within the angular interval α when the cutter support beam 135 is rotated R around the longitudinal beam extension L1.

Corresponding connection extensions (not shown) are apparent for the corresponding pivot pins 138b, 139b, 141b, 142b as well. Generally, there is a first connection extension L4, connecting each first pivot pin 138a, 138b and second pivot pin 139a, 139b, and a second connection extension L5, connecting each third pivot pin 141a, 141b and fourth pivot pin 142a, 142b.

According to some aspects, as for example illustrated for the first supporting position 135a in FIG. 8, each adjustment bolt 147a, 147b is rotatably mounted to flanges 158, 159 that are comprised in the frame part 140a, 140b and extend away from the elongated opening 143. Preferably, the mounting provides a play-free rotation of each adjustment bolt 147a, 147b. In this manner, a secure and rigid mounting of each adjustment bolt 147a, 147b is enabled, resulting in an accurate and reliable adjustment of the angular position of the cutter support beam 135, and consequently also of the angle of approach φ, being enabled, According to some aspects, for example as shown in FIG. 8-13, for each holding casing 144a, 144b, and as mainly exemplified for the first holding casing 144a, the cutting deck 130 comprises a corresponding locking screw 150a, 150b with outer locking threads 151. The first holding casing 144a comprises a slot 152 that divides the casing aperture 145, and a locking aperture 153 that comprises inner locking threads 154 and runs along the locking aperture extension L3. The locking aperture 153 is adapted to receive the corresponding locking screw 150a such that the outer locking threads 151 engage the inner locking threads 154. When the locking screw 150a is tightened, the slot 152 is decreased in width such that the adjustment bolt 147a is prevented from rotating in the casing aperture 145.

Although not shown, corresponding features and components associated with the second holding casing 144b are of course present as well.

This means that when an adjustment is about to be performed at the first supporting position, the locking screw 150a is first released, resulting in that the slot 152 is decreased in width such that the corresponding adjustment bolt 147a is released and is rotatable for performing a desired adjustment. When a satisfactory adjustment has been performed, the locking screw 150a is again tightened such that the slot 152 is decreased in width. This results in that the casing aperture 145 is decreased in size and in that adjustment bolt 147a becomes clamped and prevented from rotating in the casing aperture 145. In this way, a performed adjustment is secured from being accidentally and/or unintentionally altered.

An adjustment can thus be performed in an uncomplicated and reliable manner, in particular where the locking screws 150a, 150b and the adjustment bolts 147a, 147b are easily accessible. According to some aspects, with reference to FIG. 2 and FIG. 15, the cutting deck 130 is covered by the first body part 110 which in turn comprises a first removable cover plate 101 and a second removable cover plate 102. When a cover plate 101, 102, as exemplified for the first removable cover plate 101 in FIG. 15, is removed, access is provided to a corresponding locking screw 150a, 150b and adjustment bolt 147a, 147b. By providing access to the corresponding locking screw 150a, 150b and adjustment bolt 147a, 147b, the relation between the corresponding third pivot pin 141a, 141b and fourth pivot pin 142a, 142b can be adjusted.

According to some aspects, as shown in FIG. 8 and FIG. 13, the locking aperture extension L3 is perpendicular to the longitudinal pin extension L2.

According to some aspects, as shown in FIG. 8, the locking aperture extension L3 is perpendicular to the longitudinal beam extension L1.

According to some aspects, as shown in FIG. 11, the slot 152 has a main extension in a plane P that runs perpendicular to the locking aperture extension L3.

This provides an efficient relationship between the different extensions, providing a rigid structure with a high degree of functionality.

To further provide an accurate setting of the angle of approach φ that will not change during normal running or even when a collision occurs, it is desired to have a rigid support structure of the cutting deck 130 that provides a high degree of torsional rigidity. For this reason, according to some aspects and with reference to FIG. 5, the cutting deck 130 comprises at least two aluminum beams, in this example three aluminum beams 161, 162, 163, that run parallel to the longitudinal beam extension L1. At least two of the aluminum beams 161; 162, 163 run at different sides of the cutter support beam 135, here a first aluminum beam 161 run at one side of the cutter support beam 135 and a second aluminum beam 162 and third aluminum beam 163 run at another side of the cutter support beam 135.

The cutting deck 130 comprises a first pair of steel plates 164a, 165a and a second pair of steel plates 164b, 165b, where first distal portions of the aluminum beams 161, 162, 163 are partly sandwiched between the first pair of steel plates 164a, 165a, and where second distal portions of the aluminum beams 161, 162, 163 are partly sandwiched between the second pair of steel plates 164b, 165b.

This provides a combination of a lightweight aluminum construction and a steel construction that can withstand fatigue loads. A frame is provided with a relative low weight that is suitable for robotic lawnmowers which for example are subject to impact loads and have a long service life. The steel plates should have a sufficiently high strength to be able to distribute the loads to the standing webs of the aluminum beams 161, 162, 163.

According to some aspects, the steel plates 164a, 165a; 164b, 165b are attached to the aluminum beams 161, 162, 163 by means of screws. Joining the frame with screws gives good tolerance benefits, the screw connections should be tightened with such a high torque that the risk of slipping between the parts in the connections is minimized.

The design does not require expensive tool investments, and future design changes are easily introduced. In this way, it is possible to control the weight to be positioned where it is needed, given high speed collisions and fatigue, where a ratio between weight and durability/strength is relatively low, especially lower than for a welded frame. Furthermore, broken parts are easily replaceable, while for e.g. a welded frame, a more expensive and cumbersome replacement procedure is required.

According to some aspects, the frame parts 140a, 140b are attached to a corresponding steel plate 164a, 164b. According to some further aspects, the frame parts 140a, 140b are attached to a frame structure 161, 162, 163; 164a, 165a; 164b, 165b that is comprised in the cutting deck 130.

This way, the setting of the angle of approach φ will be stable since the structure of the cutting deck 130 is rigid and provides a high degree of torsional rigidity, which means that the link arms 136a, 136b; 137a, 137b and the cutter support beam 135 are firmly held in place in the desired position.

According to some aspects, cutting deck 130 comprises at least two cutting height adjusting means 166, 167 that are adapted to position the cutter support beam 135 at different vertical positions. In this way, a cutting height, corresponding to a height h that a main extension E1 of the cutting discs 133a, 133b, 133c will assume with respect to a horizontal ground 160, is adapted to be adjusted.

The advantages conferred by have preset a certain beneficial angle of approach φ are maximized by having the height h adjusted in dependence of the characteristics of the area to be cut. The height h can for example be more or less continuously automatically adjusted when the robotic lawnmower is running, the cutting height adjusting means 166, 167 comprises electric motors such as for example step motors.

The cutter support beam 135 is supported at respective supporting positions 135a, 135b that for example are constituted by corresponding end portions 135a, 135b of the of the cutter support beam 135. The items and features described above needed for rotating the cutter support beam 135 around the longitudinal beam extension L1 and consequently for adjusting the angle of approach φ are provided at both supporting positions 135a, 135b, although at some parts of the description, and in some of the drawings, only the relevant items and features associated with one supporting position 135a, 135b are described. This has for example been mentioned above for the holding casing 144a, 144b, where only the first holding casing 144a has been described in detail with reference to FIG. 10, FIG. 11 and FIG. 13. A corresponding view to the one shown in FIG. 13, being associated with the first end portion 135a, is of course apparent for the second end portion 135b as well.

The present disclosure relates to a cutting deck 130 according to the above. The present disclosure also relates to a robotic lawn mower 100 comprising the cutting deck 130 according to the above.

The present disclosure is not limited to the examples provided above, but may vary within the scope of the appended claims. For example, the robotic lawnmower 100 may further comprise at least one navigation sensor arrangement 115 (only schematically indicated in FIG. 1) and/or at least one environment detection device 116, 117 such as a radar transceiver, a Lidar transceiver, an ultrasonic transceiver and/or a camera device.

It should be noted that even though the description given herein has been focused on robotic lawnmowers, the teachings herein may also be applied to a floor surfacing robot arranged to polish or grind a concrete floor surface, a cleaning robot arranged to clean a floor surface, or other robotic work tools where a work tool is to operate with multiple discs and having a high demand on the surface result.

According to some aspects, when the angle of approach φ is to be adjusted, the cutting discs 133a, 133b, 133c are removed such that respective cutting motor axes are exposed. The robotic lawnmower 100 is then placed on a relatively plane surface, for example having surface plane deviation below ±1 mm. The cover plates 101, 102 are removed and suitable reference blocks with a predefined height are positioned under the respective cutting motor axis. Then the locking screws 150a, 150b can be loosened and the adjustment bolts 147a, 147b rotated such that the respective cutting motor axis reaches the corresponding reference block. Then the locking screws 150a, 150b are tightened, and then the cover plates 101, 102 and the cutting discs 133a, 133b, 133c are re-mounted.

According to some aspects, the holding casings 144a, 144b, the adjustment bolts 147a, 147b, the locking screws 150a, 150b the link arms 136a, 136b; 137a, 137b and the pivot pins 138a, 138b; 139a, 139b are comprised in an angle adjustment arrangement.

Terms such as perpendicular are not intended to be mathematically exact, but within what is suitable and/or practically obtainable in this field of technology.

The adjustable relation between the third pivot pin 141a, 141b and fourth pivot pin 142a, 142b can be obtained in several ways, the description above provides an example of how this can be achieved.

The invention claimed is:

1. A robotic lawnmower cutting deck comprising a cutting system which in turn comprises at least two cutters, each cutter comprising a cutting disc and a corresponding cutter motor, each cutting disc being drivably connected to the corresponding cutter motor, wherein the cutters are supported by a cutter support beam having a longitudinal beam extension and in turn being supported at respective supporting positions by a corresponding first link arm and a corresponding second link arm, wherein, at each of the respective supporting positions:

the link arms are pivotingly attached to the cutter support beam with a corresponding first pivot pin and second pivot pin, the link arms are pivotingly attached to a frame part with a corresponding third pivot pin and fourth pivot pin, the first pivot pin and second pivot pin are fixed relative each other, and the third pivot pin and fourth pivot pin have an adjustable relation relative each other such that the cutter support beam is rotated around the longitudinal beam extension when the relation between the third pivot pin and the fourth pivot pin is adjusted wherein, at each of the respective supporting positions one of the third pivot pin and the fourth pivot pin constitutes an adjustment pin that runs along a longitudinal pin extension via an elongated opening in the frame part and is received in a holding casing that comprises an adjustment aperture that comprises inner adjustment threads and runs perpendicular to the longitudinal pin extension, and the adjustment aperture is adapted to receive an adjustment bolt with outer adjustment threads that engage the inner adjustment threads, wherein turning of the adjustment bolt will move the holding casing such that the adjustment pin is moved within the elongated opening, and wherein the cutting deck is covered by a first body part which in turn comprises a first removable cover plate and a second removable cover plate, wherein, when a cover plate is removed, access is provided to a corresponding locking screw and adjustment bolt, enabling the relation between the third pivot pin and the fourth pivot pin to be adjusted.

2. The cutting deck according to claim 1, wherein the link arms mainly extend at an angle to the longitudinal beam extension.

3. The cutting deck according to claim 2, wherein the angle is substantially 90 degrees.

4. The cutting deck according to claim 1, wherein the adjustment bolt is rotatably mounted to a flange that is comprised in the frame part and extend away from the elongated opening.

5. The cutting deck according to claim 1, wherein, for the holding casing:

the cutting deck comprises a locking screw with outer locking threads, wherein the holding casing comprises a slot that divides the casing aperture, and a locking aperture that comprises inner locking threads and runs along a locking aperture extension, the locking aperture is adapted to receive the locking screw such that the outer locking threads engage the inner locking threads, and wherein, when the locking screw is tightened, the slot is decreased in width such that the adjustment bolt is prevented from rotating in the casing aperture.

6. The cutting deck according to claim 5, wherein the locking aperture extension is perpendicular to the longitudinal pin extension.

7. The cutting deck according to claim 5, wherein the locking aperture extension is perpendicular to the longitudinal beam extension.

8. The cutting deck according to claim 5, wherein the slot has a main extension in a plane that runs perpendicular to the locking aperture extension.

9. The cutting deck according to claim 1, wherein, for the holding casing:

the adjustment pin comprises outer holding threads and is received in a holding aperture in the holding casing, and the holding aperture comprises inner holding threads that are adapted to engage the outer holding threads.

10. The cutting deck according to claim 1, wherein the supporting positions correspond to respective end portions of the cutter support beam.

11. The cutting deck according to claim 1, wherein there is a first connection extension, connecting the first pivot pin and the second pivot pin, and a second connection extension, connecting the third pivot pin and the fourth pivot pin, wherein the first and second connection extensions move within an angular interval when the cutter support beam is rotated around the longitudinal beam extension.

12. The cutting deck according to claim 1, wherein, when the cutter support beam is rotated around the longitudinal beam extension, a main extension of the cutting discs assumes an angle of approach to a horizontal ground.

13. A robotic lawnmower cutting deck comprising a cutting system which in turn comprises at least two cutters, each cutter comprising a cutting disc and a corresponding cutter motor, each cutting disc being drivably connected to the corresponding cutter motor, wherein the cutters are supported by a cutter support beam having a longitudinal beam extension and in turn being supported at respective supporting positions by a corresponding first link arm and a corresponding second link arm, wherein, at each of the respective supporting positions:

the link arms are pivotingly attached to the cutter support beam with a corresponding first pivot pin and second pivot pin, the link arms are pivotingly attached to a frame part with a corresponding third pivot pin and fourth pivot pin, the first pivot pin and second pivot pin are fixed relative each other, and the third pivot pin and fourth pivot pin have an adjustable relation relative each other such that the cutter support beam is rotated around the longitudinal beam extension when the relation between the third pivot pin and the fourth pivot pin is adjusted, wherein the cutting deck comprises a plurality of aluminum beams that run parallel to the longitudinal beam extension, wherein two of the aluminum beams run at different sides of the cutter support beam, wherein the cutting deck comprises a first pair of steel plates and a second pair of steel plates, wherein first distal portions of the aluminum beams are partly sandwiched between the first pair of steel plates, and wherein second distal portions of the aluminum beams are partly sandwiched between the second pair of steel plates.

14. The cutting deck according to claim 13, wherein the steel plates are attached to the aluminum beams by means of screws.

15. The cutting deck according to claim 13, wherein the frame parts are attached to a corresponding steel plate among the first or second pairs of steel plates.

16. The cutting deck according to claim 1, wherein the frame part is attached to a frame structure that is comprised in the cutting deck.

17. A robotic lawn mower comprising a cutting deck comprising:

a cutting system which in turn comprises at least two cutters, each cutter comprising a cutting disc and a corresponding cutter motor, each cutting disc being drivably connected to the corresponding cutter motor, wherein the cutters are supported by a cutter support beam having a longitudinal beam extension and in turn being supported at respective supporting positions by a corresponding first link arm and a corresponding second link arm, wherein, at each of the respective supporting positions:

the link arms are pivotingly attached to the cutter support beam with a corresponding first pivot pin and second pivot pin, the link arms are pivotingly attached to a frame part with a corresponding third pivot pin and fourth pivot pin, the first pivot pin and second pivot pin are fixed relative each other, and the third pivot pin and fourth pivot pin have an adjustable relation relative each other such that the cutter support beam is rotated around the longitudinal beam extension when the relation between the third pivot pin and the fourth pivot pin is adjusted, wherein the cutting deck comprises at least two cutting height adjusting means that are adapted to position the cutter support beam at different vertical positions such that a cutting height corresponding to a height that a main extension of the cutting discs will assume with respect to a horizontal ground is adapted to be adjusted.

\* \* \* \* \*